(12) United States Patent
Jacques et al.

(10) Patent No.: US 7,578,988 B2
(45) Date of Patent: Aug. 25, 2009

(54) PREPARATION OF SILICATE OR GLASS IN A FURNACE WITH BURNERS IMMERSED IN A REDUCING MEDIUM

(75) Inventors: Remi Jacques, Aubervilliers (FR);
Pierre Jeanvoine, Courbevoie (FR);
Biagio Palmieri, Aubervilliers (FR);
Melanie Rattier, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 157 days.

(21) Appl. No.: 10/572,452

(22) PCT Filed: Sep. 7, 2004

(86) PCT No.: PCT/FR2004/050416

§ 371 (c)(1),
(2), (4) Date: Nov. 13, 2006

(87) PCT Pub. No.: WO2005/028364

PCT Pub. Date: Mar. 31, 2005

(65) Prior Publication Data

US 2007/0122332 A1 May 31, 2007

(30) Foreign Application Priority Data

Sep. 19, 2003 (FR) .................................. 03 11006
Oct. 23, 2003 (FR) .................................. 03 12383
Nov. 13, 2003 (FR) .................................. 03 13272

(51) Int. Cl.
*C01B 33/20* (2006.01)
*C01B 33/24* (2006.01)
*C01B 33/32* (2006.01)

(52) U.S. Cl. .................. 423/326; 423/331; 423/332
(58) Field of Classification Search .............. 423/263, 423/331–334, 326, DIG. 12
See application file for complete search history.

(56) References Cited

U.S. PATENT DOCUMENTS 1,425,048 A 8/1922 Peacock (Continued)

FOREIGN PATENT DOCUMENTS

AU 200023016 B2 * 8/2000

(Continued)

OTHER PUBLICATIONS

Winnacker, Kuechler, "Chemische Technologie, Band 3, Anorganische Technologie", Carl Hanser Verlag, Muenchen, pp. 58-61 + 82-83, 1983.

(Continued)

*Primary Examiner*—Steven Bos
*Assistant Examiner*—Anthony J Zimmer
(74) *Attorney, Agent, or Firm*—Oblon, Spivak, McClelland, Maier & Neustadt, P.C.

(57) ABSTRACT

The invention relates to a process for preparing a silicate of an element chosen from alkali metals, alkaline-earth metals or rare earths, comprising a reaction between silica and a sulfate of said element in a reactor equipped with at least one submerged burner within a molten mass, said submerged burner being fed with a gas containing oxygen, an excess of fuel/reducing agent being introduced into the reactor relative to the oxygen effectively consumed. The process allows the reaction to be carried out satisfactorily and at relatively low temperature.

22 Claims, 2 Drawing Sheets

U.S. PATENT DOCUMENTS

| | | | |
|---|---|---|---|
| 2,211,733 A * | 8/1940 | Soderberg | 423/332 |
| 2,239,880 A | 4/1941 | Curll | |
| 2,352,738 A | 7/1944 | Ruthruff | |
| 3,260,587 A * | 7/1966 | Marceau et al. | 65/134.5 |
| 4,545,800 A | 10/1985 | Won et al. | |
| 4,551,161 A | 11/1985 | Savolskis et al. | |
| 4,681,750 A * | 7/1987 | Johnson et al. | 423/339 |
| 4,857,289 A * | 8/1989 | Nauroth et al. | 423/339 |
| 5,785,940 A | 7/1998 | Carroll et al. | |
| 6,717,026 B2 * | 4/2004 | Wagner | 588/314 |
| 6,883,349 B1 * | 4/2005 | Jeanvoine | 65/134.3 |
| 7,448,231 B2 * | 11/2008 | Jeanvoine et al. | 65/134.5 |

FOREIGN PATENT DOCUMENTS

| | | | |
|---|---|---|---|
| AU | 200023016 B2 * | 8/2000 | |
| AU | 2002356211 B2 * | 4/2003 | |
| WO | 00/46161 | 8/2000 | |
| WO | 03/031357 | 4/2003 | |

OTHER PUBLICATIONS

U.S. Appl. No. 12/240,068, filed Sep. 29, 2008, Jeanvoine, et al.

* cited by examiner

PREPARATION OF SILICATE OR GLASS IN A FURNACE WITH BURNERS IMMERSED IN A REDUCING MEDIUM

This application is the national state application of the international application PCT/FR04/50416 filed Sep. 7, 2004 (WO 2005/028364), the text of which is hereby incorporated by reference and this application claims priority to the French application no. 0311006 filed Sep. 19, 2003, the French application no. 0312383 filed on Oct. 23, 2003 and the French application no. 0313272 filed Nov. 13, 2002.

The present invention relates to a process for preparing glass or a silicate, such as sodium silicate, that can be used to manufacture glass or silica in the form of particles (precipitated silica).

Within the context of the present invention, the term "batch materials" is understood to mean all materials, vitrifiable substances, natural ores or synthesized products, materials resulting from cullet recycling, etc. that can be incorporated into the composition feeding a glass furnace. The term "glass" is understood to mean glass in the broad sense, that is to say encompassing any material with a glass, glass-ceramic or ceramic matrix, the main constituent of which is silica. The term "manufacture" includes the indispensable step of melting the batch materials and possibly all the subsequent/supplementary steps for the purpose of refining/conditioning the molten glass for the purpose of its final forming operation, especially in the form of flat glass (glazing), hollow-ware (flasks, bottles), glass in the form of mineral (glass or rock) wool used for its thermal or acoustic insulation properties, or even possibly glass in the form of yarns referred to as textile yarns used in reinforcement.

The invention relates most particularly to the batch materials needed to manufacture glasses having a significant content of alkali metals, especially sodium, for example glasses of the silica-soda-lime type used to make flat glass. The batch material currently used most often for providing sodium or potassium is sodium carbonate $Na_2CO_3$ or potassium carbonate $K_2CO_3$, which choice is not without its drawbacks since, on the one hand, this compound provides only sodium as constituent element of the glass, the entire carbonate part decomposing in the form of evolution of $CO_2$ during melting. On the other hand, this is an expensive batch material, compared with the others, since it is a synthetic product obtained by the Solvay process from sodium chloride and lime, which process involves a number of manufacturing steps and consumes a great deal of energy.

This is the reason why it has been proposed to use as sodium source not a carbonate but a silicate, possibly in the form of a mixed alkali metal (Na)/alkaline-earth metal (Ca) silicate prepared beforehand. The use of this type of intermediate product has the advantage of jointly providing several of the constituents of the glass, of eliminating the decarbonatization phase and of reducing $CO_2$ emissions from the melting furnace. It also makes it possible to speed up the melting of the batch materials in their entirety and of favoring their homogenization during melting as indicated, for example, in the patents FR 1 211 098 and FR 1 469 109. However, this approach poses the problem of the manufacture of this silicate.

A first method of synthesis was described in the patent WO 00/46161: this involves the conversion of a halide, for example NaCl, and silica into a silicate at high temperature, the heat supply being provided by submerged burners. Combustion by submerged burners is already known, for example from the U.S. Pat. No. 3,627,504, U.S. Pat. No. 3,260,587 or U.S. Pat. No. 4,539,034, for melting vitrifiable materials to make glass. To use this technology in a context different from the synthesis of silicates, and therefore upstream of the actual glass manufacture, indeed offers many advantages: this method of combustion causes, within the materials undergoing reaction, strong turbulence and vigorous convection motion around the gas jets or flames from the submerged burners. This promotes very effective stirring of the reactants. Furthermore, submerged burners provide the heat directly at the point where it is needed, into the mass of the products undergoing reaction. It is also an environmentally friendly method of combustion. Direct conversion of NaCl and silica carried out in this way is therefore very attractive for more than one reason. However, it turns out that this direct conversion is not easy to implement on a large scale.

WO 03/031357 teaches the manufacture of a silicate in two separate steps, the overall reaction involving a halide (such as NaCl) and silica in order to make a silicate, this overall reaction passing via the manufacture of a sulfate. The above document teaches that carbon or sulfur may be used as solid fuel.

The object of the invention is firstly to develop a method of manufacturing a silicate that is particularly productive and easy to use on an industrial scale. Furthermore, this novel type of manufacture may also be environmentally friendly insofar as all the reaction products involved can be utilized or recycled.

The term "submerged burners" is understood to mean burners configured so that the "flames" that they generate or the combustion gases emanating from these flames develop in the reactor where the conversion takes place, within the very mass of the materials being converted (the reaction mass). Generally speaking, the burners are placed so as to be flush with or slightly proud of the side walls or the floor of the reactor used.

The subject of the invention is firstly a method of manufacturing compounds based on one or more silicates of alkali metals, such as Na and K, and/or of alkaline-earth metals, such as Ca and Mg, and/or of rare earths, such as Ce, possibly in the form of mixed silicates combining at least two of these elements. This method involves a conversion reaction in which said sulfates with silica are converted into the corresponding silicates, the heat supply needed for this conversion being provided, at least in part, by a combustion reaction using one or more submerged burners. Thermal energy is injected into the submerged-burner furnace sufficient to form the silicate and for the latter to remain liquid and of low enough viscosity to flow sufficiently rapidly out of the furnace. The advantage of submerged burners is that they inject the necessary heat directly into the liquid reaction mass, this injection also causing effective stirring of the various materials in the furnace owing to the turbulence generated by the gases stirring them. According to the invention, it is preferable to inject most of the energy via the submerged burners, but it is not excluded either to inject some of this by another means, such as resistance heating elements, although the coexistence of resistance heating elements and submerged burners is not recommended (corrosion of the resistance elements). In general, a heat supply of between 500 and 2500 kWh per ton of silicate produced is suitable.

Combustion by submerged burners requires an injection of oxygen, either in the form of pure oxygen or in the form of a mixture of oxygen with at least one other gas, such as air. This oxygen is intended to react with the fuel in order to generate the necessary heat. Depending on the nature of the fuel and the way it is introduced, the fuel can react relatively rapidly with the oxygen. Thus, if the fuel is a gas (a hydrocarbon, such as methane, propane or butane, or a sulfur-containing gas, such as $H_2S$) fed directly into the submerged burner already supplied with oxygen, the combustion is rapid and estimated to be complete (it should be understood here, of course, that the fuel and the oxygen arrive at the same point in the submerged burner, for example via a premixing cell. This means that if the submerged burner is supplied stoichiometrically with oxygen and with combustible gas, all the combustible gas and all the oxygen react together. On the other hand, if the oxygen is in excess relative to this stoichiometry, a measurable amount of oxygen will escape with the flue gases. If the combustible gas is in excess with respect to this stoichiometry, this fuel will also have a tendency to escape, but there will be a risk of relatively explosive postcombustion, a situation that cannot therefore be recommended.

It is also possible to introduce solid fuel such as, for example, solid sulfur or solid carbon (coal). In this case, the solid fuel is generally introduced into the reaction vessel as batch materials, that is to say independently of the submerged burners, but in any case as close as possible to said burners if it is desired for the solid fuel to react effectively with the oxygen flowing in via said burners. However, even if this solid fuel is introduced very close to the submerged burners, it is difficult to have perfect combustion efficiency, which means that oxygen may generally pass through the reaction mass without completely reacting with the fuel and be found (in measurable amount) in the flue gases, even if the fuel is in stoichiometry or even in excess with respect to oxygen.

According to the invention, an excess of fuel (or reducing agent) is introduced relative to the oxygen actually consumed (and not relative to the oxygen only introduced). This is because the Applicant has discovered that if the reaction medium has excess fuel, the silicate formation reaction is activated and can even be carried out at a lower temperature than in the absence of this excess, which also amounts to stating that the silicate formation reaction is activated at lower temperatures than in the absence of this excess. It seems that the excess fuel, not consumed by the oxygen from the submerged burners, plays in fact in this case a direct role in the silicate formation reaction, this role being of the reducing type. Without the present explanation being in any way limiting, at least one of the following reactions might then be involved:

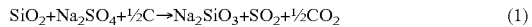

$$SiO_2 + Na_2SO_4 + \tfrac{1}{2}C \rightarrow Na_2SiO_3 + SO_2 + \tfrac{1}{2}CO_2 \quad (1)$$

$$SiO_2 + Na_2SO_4 + \tfrac{1}{2}S \rightarrow Na_2SiO_3 + \tfrac{3}{2}SO_2 \quad (2)$$

reaction (1) taking place in the presence of a carbon fuel or a fuel that generates carbon, such as coal, coke or a carbon-containing plastic (a polymer such as polyethylene, polypropylene or the like) and reaction (2) taking place in the presence of a fuel containing or generating sulfur. It is also possible to use a fuel containing both carbon and sulfur such as, for example, a vulcanized rubber (such as from motor vehicle tires).

According to the invention, the situation may therefore be especially as in one of the following a) submerged burners supplied with oxygen (which may include air) and with combustible gas, the combustible gas being in short supply relative to the oxygen and being completely consumed by the oxygen, a solid or liquid fuel being also added to the reaction mass, which partially reacts with the oxygen but is present in a sufficiently large amount not to be completely consumed by the oxygen and to act as a reducing agent within the meaning of the invention in order to promote silicate formation, it being possible for some oxygen to escape with the flue gases;

b) submerged burners supplied with oxygen (which may include air) and with combustible gas, the combustible gas and the oxygen being in stoichiometric ratio, the oxygen and the combustible gas reacting completely together, a solid or liquid fuel or gaseous fuel (such as $H_2S$) also being added to the reaction mass, and acting as a reducing agent within the meaning of the invention in order to promote silicate formation;

c) submerged burners supplied with oxygen (which may include air) without combustible gas, a solid or liquid fuel also being added to the reaction mixture, reacting with at least part of the oxygen but being present in a sufficiently large amount to also act as a reducing agent within the meaning of the invention in order to promote silicate formation, some of the oxygen generally escaping with the flue gases; and d) submerged burners supplied with oxygen (which may include air) and with combustible $H_2S$ gas, the combustible gas being in excess relative to the oxygen and acting as a reducing agent relative to the sulfate, promoting silicate formation.

In all these situations, it may be seen that there is excess fuel in the reaction mixture relative to the effectively reacting oxygen. The effectively reacting oxygen can be easily determined by measuring the oxygen escaping in the flue gases. A person skilled in the art is able, by routine tests, knowing the amounts of oxygen not reacting, to determine the necessary amounts of fuel to be introduced in order to be in excess fuel mode within the context of the invention.

It should be pointed out that the "fuel" materials or the "reducing" materials are merely the same and can fulfill both roles—the fuel role being played by reaction with the oxygen, the reducing role being played in the silicate formation reaction. Within the context of the invention, the excess fuel allows this combustible material to play a larger reducing role.

Thus, the subject of the invention is firstly a process for preparing a silicate of an element chosen from alkali metals, alkaline-earth metals or rare earths, comprising a reaction between silica and a sulfate of said element in a reactor equipped with at least one submerged burner within a molten mass, said submerged burner being supplied with an oxygen-containing gas, an excess of reducing fuel being introduced into the reactor relative to the effectively consumed oxygen.

Within the context of the present invention, the excess fuel plays a reducing role thanks to the carbon or sulfur that it contains and it combines with the sodium sulfate. For each fuel, it is possible to define a carbon equivalent or a sulfur equivalent corresponding to the mass of pure carbon or sulfur that the fuel in fact provides as reducing agent. To give an example, a hydrocarbon polymer has a higher mass than the carbon that it contains and it actually acts as a reducing agent. Within the context of the present invention, the excess fuel preferably represents 0.1 to 2 mol, and more preferably 0.3 to 1 mol, of carbon or sulfur equivalent per mole of sulfate. Thus, the excess reducing fuel may be a solid or a liquid acting as a source of carbon or sulfur, or both as a source of carbon and sulfur. The following materials may be mentioned as examples of solid or liquid fuel supplying sulfur and/or carbon: vulcanized rubbers, tires, wood, board, paper, animal flour, crude oil-contaminated sand (the latter material being both a source of fuel/reducing agent and of silica) and fuel oil. The fuel that can be in excess may also be a sulfur-containing gas such as $H_2S$.

A silica/sulfate molar ratio is used that corresponds to the silicate that it is desired to obtain. This silicate may be represented by the formula $M_xO_y \cdot n(SiO_2)$, in which M represents an alkali or alkaline-earth metal or a rare earth, x and y represent positive integers or non-integers, and n represents a positive integer or non-integer. $M_xO_y$ can in particular be $Na_2O$, $K_2O$, $CeO_2$. In general, n (the $SiO_2/M_xO_y$ molar ratio) is between 1 and 4 and more particularly between 1.3 and 4, especially when M represents an alkali or alkaline-earth metal. For the case in which M is Na, n is more particularly between 1.5 and 3.8. For the case in which M is a rare earth, such as Ce, n may generally be greater than 5 and generally less than 1000.

In the reaction mass there are at least the following separate phases:
  solid silica;
  liquid sulfate;
  liquid silicate; and
  gases emanating from the submerged burners and from the silicate formation reaction (which may contain, depending on the case, $SO_2$, $SO_3$, $CO_2$, $H_2$, $H_2O$, $O_2$, etc.).

The reaction medium therefore contains many separate phases and the submerged-burner technology is particularly effective for vigorously stirring them and for making the reaction proceed.

The liquid sulfate and the liquid silicate form two separate phases. Reaction conditions (temperature, residence time, stirring induced by the submerged burners, excess reducing agent) are sought such that the liquid sulfate phase disappears before exit from the reactor, and in any case is present in the smallest amount possible during manufacture. This residual amount of sulfate is usually expressed as the amount of $SO_3$. The absence of sulfate at the exit of the reactor shows that the sulfate has indeed reacted. If this is not the case, undesirable sulfate inclusions may be seen with the naked eye in the final silicate. In addition, when hot, there may be splashes of relatively explosive liquid sulfate downstream of manufacture. In general, this drawback may be remedied by increasing the excess amount of reducing agent. The minimum amount of excess reducing agent can therefore be determined by the disappearance of the sulfate phase in the final silicate. It is unnecessary to introduce an excessively large excess amount of reducing agent as this may lead to a yellow-brown coloration (due to the formation of sulfide ions $S^{2-}$) visible to the naked eye in the final silicate, which coloration is undesirable. In general, the excess reducing agent is between one and two times the excess amount necessary for disappearance of the sulfate phase. Thus, it is preferred to introduce an excess of fuel in an amount sufficient for the silicate to contain no sulfate inclusion.

A sufficiently high temperature is chosen in order to make the reaction proceed, resulting in a suitable viscosity of the reaction mixture. This is because, if the viscosity is too high, the reaction mass solidifies and the reaction does not proceed. If the viscosity is too low, there will be excessive splashing, which tends to erode the walls and the roof and can therefore result in undesirable foreign particles in the product of manufacture. In addition, material going onto the walls and the roof is no longer available to react with the material introduced. In fact, these two extremes both result in particularly insufficient stirring of the reactants, thereby reducing the efficiency. Correct stirring of the mixture also results in temperature uniformity throughout the reaction mass. The aim is for the silicate phase to have a viscosity of between 50 and 3000 poise, and more particularly between 100 and 1000 poise, at the temperature of the reaction mixture. In general, a temperature between 1000 and 1500° C., and more particularly between 1200 and 1400° C., is suitable.

The final silicate is a solid translucent at room temperature. Preferably, it contains no batch stones, that is to say particles of the initial silica that have not participated in the reaction. The presence of batch stones may be remedied by increasing the residence time in the reactor.

Preferably, the reactor for preparing the silicate is followed by a refining vessel. This vessel is separate from the reactor so as to prevent any silicate from the vessel slipping back into the reactor and to prevent the silicate undergoing refining from being contaminated by raw silicate from the reactor. This refining operation affords the following advantages:
  the last batch stones (silica particles) are eliminated;
  the maximum amount of sulfur is eliminated from the final silicate (sulfur released in $H_2S$ by the final silicate is toxic and produces undesirable smells);
  the redox is lowered—in practice the aim is to have, at exit from the vessel, a redox (equal to the total $FeO/Fe_2O_3$ mass ratio in the final silicate) of less than 0.5, or even less than 0.4; and
  the excess reducing agent still in the silicate is consumed, which amounts to improving the efficiency of the silicate formation reaction (the reducing agent that is not reacted with the sulfate in the reactor is consumed).

The refining vessel is generally equipped with heating means, such as at least one submerged burner. Such a burner generates a flame of greater or lesser oxidizing power depending on the intended redox at exit. Such burners may be supplied with combustible gas and with air or with oxygen with oxygen being in excess relative to the combustible gas. During this refining operation, the raw silicate becomes clearer, even becoming colorless and translucent. The temperature of the silicate in the refining vessel is generally between the same temperature as in the reactor and 150° C. below the temperature in the reactor, and preferably between 50° C. below the temperature in the reactor and 150° C. below the temperature in the reactor.

The separation between the melting reactor and the refining vessel may be a channel or a spillway or partitions along the sides.

The "silica" may be introduced into the reaction mixture as any compound containing predominantly silica (silicon oxide) $SiO_2$, even if it may also contain other elements or other minority compounds, which is very particularly the case when natural materials, such as sand, are used.

The effectiveness of the burners in all aspects (quality of the mixing, excellent heat transfer) means that the conversion via the reaction is greatly favored, and is so without there being a need to attain extremely high temperatures.

Another advantage of submerged burners is the following: they allow the introduction of liquid/solid fuels in the same way as the vitrifiable batch materials. This consequently results in varied redox ratios of the molten silicate, in the reactor, possibly ranging from 0.1 to 0.9 depending on the residence time (a longer residence time results in a lower redox ratio). In fact, at the inlet of the reactor, at the point where the various batch materials are charged, it is necessary for the redox ratio to be relatively high (between 0.35 and 0.9), this being favorable to the sulfate decomposition reaction. After the refining vessel, the redox ratio is generally in the 0.1 to 0.9 range.

The chosen oxidizer for feeding the submerged burner(s) (reactor or refining vessel) may simply be air. However, it is preferential to use an oxidizer in the form of oxygen-enriched air, and even an oxidizer substantially in the form of oxygen alone. A high oxygen concentration is advantageous for various reasons: the volume of combustion flue gas is thus reduced, this being favorable from the energy standpoint and avoids any risk of excessive fluidization of the materials undergoing the reaction, that may cause splashing against the superstructures, especially the roof of the reactor where the conversion takes place. Furthermore, the "flames" obtained are shorter and more emissive, thereby allowing their energy to be transferred more rapidly to the materials undergoing melting/conversion. In addition, where appropriate, the sulfur oxide concentration in the flue gases is higher, facilitating the subsequent conversion to sulfuric acid.

As regards the choice of fuel for the submerged burner(s), three approaches are possible, as alternatives or in combination: it is possible to choose a liquid fuel, a gaseous fuel or a fuel in solid form.

If it is at least partly in gaseous form, it may feed the submerged burners directly. If it is in liquid or solid form, it may be injected close to the submerged burners.

As gaseous fuel, mention may be made of natural gas (predominantly methane), propane, hydrogen or any other hydrocarbon compound and/or sulfur compound, especially $H_2S$ (the advantage of $H_2S$ is there is no discharge of $CO_2$ into the atmosphere).

As solid or liquid fuel, mention may be made of any compound predominantly in carbon compound and/or hydrocarbon compound and/or sulfur compound (including sulfur and carbon): as in the previous case, these may be byproducts of the oil industry (heavy fuel oil, asphalt, etc.). They may be polymer-based materials that can thus be recycled (any plastics, tires, vulcanized rubber, etc.), and even hydrocarbon-contaminated sand, which will also provide both the silica and the fuel, which is an ingenious way of dealing with the problem of decontaminating beaches after an oil spillage for example.

According to the invention, it is especially possible to use sulfur-containing fuels such as sulfur compounds, like worn tires (which may contain, for example, 0.5 to 4% sulfur), or even pure sulfur. There are traces of sulfur in all vulcanized polymers (tires) and sulfur is also found in byproducts of the oil industry, and the invention allows them to be beneficially utilized: this is because the sulfur contained in the fuel provided for carrying out combustion reaction will be oxidized. Specifically, these sulfur oxides ($SO_2$ and/or $SO_3$) can be converted into sulfuric acid, by recovering them from the flue gases and treating them appropriately. There are therefore two choices (alternative or cumulative in fact, especially depending on the quantity of $H_2SO_4$ manufactured, which depends intimately on the chosen S content of the fuel): either the $H_2SO_4$ is utilized, as a reactant widely used in the chemical industry, independently of the process according to the invention, or it is reused in a variant of the process of the invention. Specifically, the combustion product of the silicate formation reaction is used, in a "feedback" process, as reactant for reacting with the silicate and resulting in precipitated silica. Thus, the invention also relates to a process for preparing a precipitated silica, comprising a step a) of preparing a silicate as claimed in one of the preceding claims, the reactor being equipped with a stack, this being fitted with a system for recovering the sulfur oxide, resulting in sulfuric acid, a step b) for the acid treatment of the silicate produced at a) with the sulfuric acid produced at a), resulting in, on the one hand, precipitated silica, and on the other hand, the sulfate of said element being recycled at a).

There is another way, as an alternative to or in combination with the previous one, of manufacturing $H_2SO_4$ from the process according to the invention: the reaction of converting sulfate to silicate itself produces sulfur oxides $SO_2$ and/or $SO_3$. Here again, these sulfur oxides may therefore be recovered and made to undergo a conversion reaction, converting them to sulfuric acid. As in the previous case, this sulfuric acid may be reused as reactant with silicate and/or it may be utilized as a reactant for the chemical industry.

As a result, if the fuel contains a significant amount of sulfur, these two reactions of converting sulfur oxides to sulfuric acid may produce more, and even significantly more, sulfuric acid than is needed for reaction of converting the halides to sulfates, resulting in the beneficiation of the process according to the invention in its entirety.

A first outlet for the silicates manufactured according to the invention is in the glass industry: they may substitute, at least in part, for the conventional batch materials that provide alkali metals or rare earths, with, very particularly as regards sodium, at least partial substitution of $Na_2CO_3$ and of sand with the silicate. The silicates of the invention can therefore be employed for feeding a glass furnace. Before subsequent conversion, for example in a glass furnace, the silicate may be converted into granules, for temporary storage. The glass furnace may be of conventional design (for example, an electric melting furnace using submerged electrodes, a crown-fired furnace operating with lateral regenerators, a horseshoe-fired furnace and any type of furnace known in the glass industry thus including submerged-burner furnaces), possibly with a design and an operating method that are slightly modified so as to be suitable for a melting process with no carbonate or with less carbonate than for standard melting operations.

It should be noted that certain silicates other than sodium silicate are also very useful to manufacture according to the invention. Thus, the invention allows potassium silicate to be manufactured from $K_2SO_4$, which is, at least economically, very advantageous as batch material containing Si and K for the manufacture of what is referred to as "mixed-alkali" glass, that is to say glass containing both Na and K. Such glass is used especially for producing tactile screens, glass for television screens and glass for plasma display panels.

Likewise, the invention allows more economical manufacture of special glasses containing additives, for which chlorides are less expensive than oxides. This is the case with rare earths such as cerium—the presence of cerium oxide giving the glasses UV-screening properties—and rare earths of this type are also found in the composition of special glasses of high elastic modulus for hard disks. The invention thus makes it possible to have a batch material containing Si and Ce, namely cerium silicate, for a moderate cost.

A second outlet for the silicates manufactured according to the invention (apart from those used as batch materials for a glass furnace), more particularly sodium silicate, is in the detergents industry, sodium silicate frequently being incorporated into the composition of washing powders/detergents.

A third outlet for the silicates formed according to the invention is in the preparation of special silicas commonly referred to as "precipitated silicas" that are incorporated for example in the composition of concretes. This is because the silicates formed according to the invention may undergo acid attack, advantageously by sulfuric acid, so as to precipitate silica in the form of particles having a particular particle size: the intended particles are generally of nanoscale dimensions (0.5 to 300 nm and 1 to 100 nm for example).

To carry out the reaction of converting the sulfates to silicates, it is possible to use, as described in the patent WO-00/46161, a reactor equipped with one or more submerged burners and with at least one means of introducing the silica and/or the sulfates below the level of the molten materials, especially in the form of one or more feed-screw batch chargers. Preferably, the same applies in the case of the solid or liquid fuels possibly used, such as the carbon and/or hydrocarbon and/or sulfur compounds (including solid sulfur and solid carbon) mentioned above. It is thus possible to introduce, directly into the mass of products undergoing melting/reaction, at least those of the starting reactants that can vaporize before having the time to react.

The process according to the invention described above therefore has many advantages, among which:
- a reduction in $CO_2$ emissions in glass furnaces which completely or partly substitute sodium carbonate with sodium silicate—these furnaces consume less energy since the decarbonatization reactions are reduced or eliminated;
- a possibility of turning the process into a feedback process, with the $H_2SO_4$ byproduct manufactured being reused; and
- a possibility of utilizing sulfur-containing derivatives as fuel.

Figure 1:
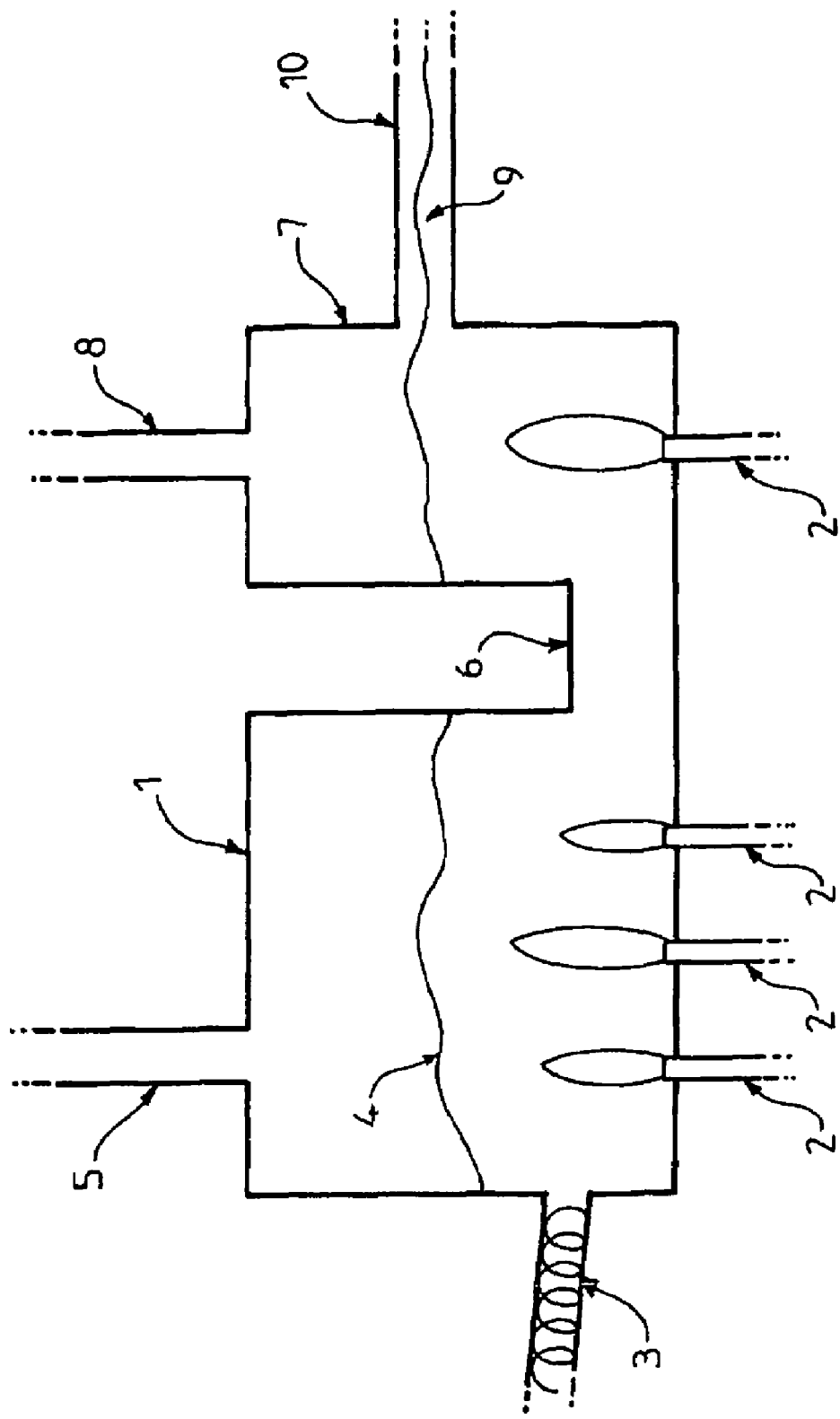
FIG. 1 shows a silicate manufacturing plant comprising a reactor followed by a refining vessel.

FIG. 1 shows a reactor 1 equipped with submerged burners 2 and including a system 3 for introducing solid materials (sand, sulfate, coal, sulfur, etc.) below the level of the reaction mass 4, the flue gases escaping via the stack 5. The raw silicate passes via channel 6 into the refining vessel 7, which is equipped with at least one submerged burner with a more oxidizing flame than those of the reactor. The flue gases generated in the refining vessel escape via the stack 8. The refined silicate 9 is recovered via the spillway 10.

Figure 2:
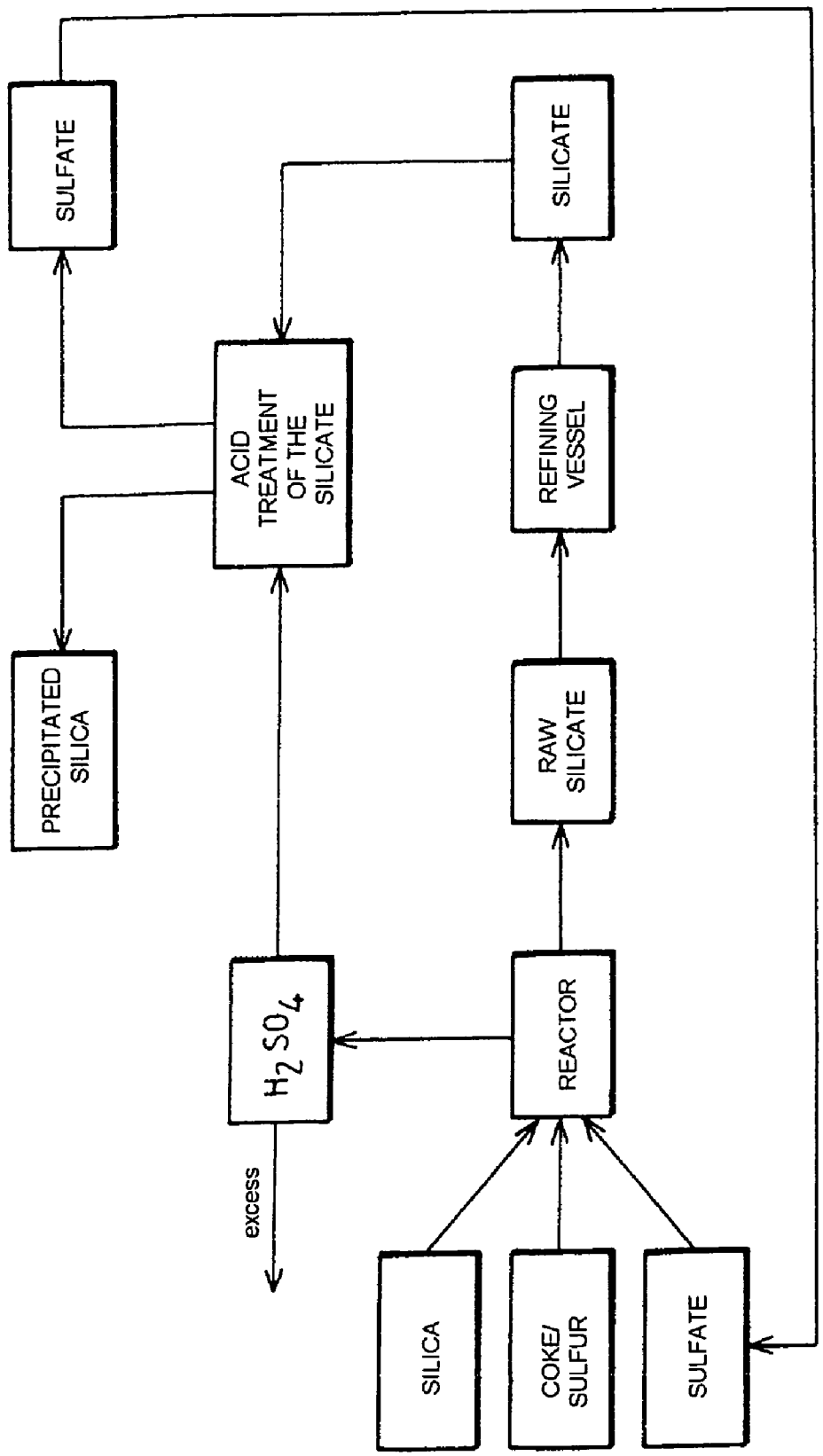
FIG. 2 is a diagram of a preferred version of the method according to the invention, operating in a feedback loop and resulting in a precipitated silica.

FIG. 2 shows how the silicate manufactured according to the invention can be retreated with the sulfuric acid produced in the melting reactor in order to prepare precipitated silica of calibrated particle size. The silicate on the one hand and the sulfate on the other are fed back into this process. The sulfuric acid is also fed back, an excess amount possibly being created depending on the nature of the fuel and/or of the reducing agent used.

EXAMPLE 1

A melting furnace equipped with a submerged burner followed by a refining vessel equipped with a submerged burner were used. The furnace and the vessel were both cylindrical (of vertical axis) and both had a floor area of 0.07 m$^2$. The submerged burners (furnace and vessel) both operated stoichiometrically with methane and pure oxygen (the oxygen was therefore entirely consumed in each burner flame). Sand and sodium sulfate were introduced into the furnace in a ratio allowing a sodium silicate to be obtained having an $SiO_2/Na_2O$ molar ratio of 3.5. Also introduced was coke, acting as excess fuel/reducing agent, in an amount of 0.5 mol of carbon per mole of sulfate introduced. The output was 3 metric tons per day per m$^2$. The furnace and the vessel both operated at 1300° C. The redox ratio (weight ratio of FeO to total $Fe_2O_3$) on exiting the furnace was 0.7 and the residual $SO_3$ ($SO_3$ dissolved by the silicate) was 0.42% by weight (measured by X-ray fluorescence or by carbon/sulfur analysis), indicating that the efficiency of the reaction in the furnace was around 98%. In the refining vessel, the residual sulfate reacted with the residual reducing agent. Obtained at the exit of the vessel was a silicate of formula $Na_2O.3.5(SiO_2)$ which was translucent and colorless, the residual $SO_3$ ($SO_3$ evolution from the residual sulfate) was less than 0.05%. The redox ratio here was 0.20.

EXAMPLE 2

This example is the same as the previous one, except that the submerged burner of the refining vessel operated with an insufficiency of oxygen (reducing flame with an oxygen flow rate 15% below stoichiometry). Obtained at the exit of the vessel was a translucent and colorless silicate of formula $Na_2O.3.5(SiO_2)$, the residual $SO_3$ content of which was less than 0.05%. In this case redox ratio was 0.55.

EXAMPLE 3 (COMPARATIVE EXAMPLE)

This example is as in Example 1 except that there was no excess addition in the form of coke. Inclusions of sodium sulfate visible to the naked eye were found in the final silicate. The residual $SO_3$ was greater than 1%. This indicates a reaction efficiency much lower than that of Example 1. The sulfate introduced did not decompose sufficiently. Enrichment with silica is too great, the reaction mass rapidly becoming too viscose, and the reactor had to be stopped.

EXAMPLE 4

This example is as in Example 1 except that the excess reducing agent in the form of coke was replaced with an excess of reducing agent in the form of spent tires, the composition of which was approximately 2% sulfur by weight, 80% carbon by weight and 18% hydrogen by weight. This reducing agent was introduced in an amount representing 5% of the mass of sodium sulfate introduced. A silicate containing 0.1% residual $SO_3$ was obtained, the redox ratio of which was 0.5. The presence of sulfur in the reducing agent allowed additional sulfuric acid to be produced.

The invention claimed is:

1. A process for preparing a silicate of an element chosen from alkali metals, alkaline-earth metals or rare earths, comprising reacting silica and a sulfate of said element in a reactor equipped with at least one submerged burner within a molten mass, said submerged burner being supplied with an oxygen-containing gas, an excess of reducing fuel being introduced into the reactor relative to the effectively consumed oxygen, wherein the silicate does not contain sulfate inclusion.

2. The process of claim 1, wherein the excess fuel represents from 0.1 to 2 mol of carbon equivalent and/or sulfur equivalent per mole of sulfate.

3. The process as claimed in claim 1, wherein the excess fuel represents from 0.3 to 1 mol of carbon equivalent and/or sulfur equivalent per mole of sulfate.

4. A process for preparing a silicate of an element chosen from alkali metals, alkaline-earth metals or rare earths, comprising reacting silica and a sulfate of said element in a reactor equipped with at least one submerged burner within a molten mass, said submerged burner being supplied with an oxygen-containing gas, an excess of reducing fuel being introduced into the reactor relative to the effectively consumed oxygen, wherein the excess fuel represents from 0.1 to 2 mol of carbon equivalent and/or sulfur equivalent per mole of sulfate.

5. The process as claimed in claim 4, wherein the excess fuel/reducing agent is a solid or liquid acting as a source of carbon.

6. The process as claimed in claim 4, wherein the excess fuel/reducing agent is a solid or liquid acting as a source of sulfur.

7. The process as claimed in claim 4, wherein the excess fuel/reducing agent is a gas acting as source of sulfur.

8. The process as claimed in claim 4, which produces a reaction mass containing a silicate phase, wherein the silicate phase has a viscosity of between 50 and 3000 poise.

9. The process as claimed in claim 8, wherein the silicate phase in the reaction mass has a viscosity of between 100 and 1000 poise.

10. The process as claimed in claim 4, wherein the reaction temperature is between 1000 and 1500° C.

11. The process as claimed in claim 10, wherein the reacting is conducted at a temperature between 1200 and 1400° C.

12. The process as claimed in claim 4, wherein the silicate does not contain sulfate inclusion.

13. The process as claimed in claim 4, wherein the excess fuel represents from 0.3 to 1 mol of carbon equivalent and/or sulfur equivalent per mole of sulfate.

14. The process as claimed in claim 4, further comprising refining the silicate.

15. The process as claimed in claim 14, wherein the silicate is refined in a refining vessel, wherein the temperature of the silicate in the refining vessel is between the temperature in the reactor and 150° C. below the temperature in the reactor.

16. The process as claimed in claim 15, wherein the temperature of the silicate in the refining vessel is between 50° C. below the temperature in the reactor and 150° C. below the temperature in the reactor.

17. The process as claimed in claim 14, wherein the vessel is equipped with at least one submerged burner.

18. The process as claimed in claim 14, wherein the redox ratio in the silicate leaving the vessel is less than 0.5.

19. The process as claimed in claim 4, wherein the silicate is of formula $M_xO_y.n(SiO_2)$ in which $M_xO_y$ represents $Na_2O$ or $K_2O$ and n represents a number of moles between 1 and 4.

20. The process as claimed in claim 19, wherein n is between 1.3 and 4.

21. A process for preparing a precipitated silica, comprising:
a) preparing a silicate as claimed in claim 4, the reactor being equipped with a stack, which is fitted with a system for recovering the sulfur oxides, resulting in sulfuric acid; and
b) acid treating the silicate produced in a) with the sulfuric acid produced in a), resulting in a precipitated silica and the sulfate of said element, said sulfate being recycled in a).

22. The process as claimed in claim 21, wherein the precipitated silica has a size of between 0.5 and 300 nm.

* * * * *